United States Patent
Sorensen et al.

(10) Patent No.: US 6,210,170 B1
(45) Date of Patent: *Apr. 3, 2001

(54) METHOD FOR TEACHING IN A SCREEN-SAVER ENVIRONMENT

(76) Inventors: Steven M. Sorensen; Kim L. Sorensen, both of 1953 N. 690 East, Orem, UT (US) 84057

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/173,305

(22) Filed: Oct. 15, 1998

Related U.S. Application Data

(63) Continuation of application No. 09/173,305, filed on Oct. 15, 1998, now abandoned, which is a continuation of application No. 08/703,348, filed on Aug. 26, 1996, now Pat. No. 5,827,071.

(51) Int. Cl.[7] .................................................. G09B 7/00
(52) U.S. Cl. .................. 434/323; 434/118; 434/238; 434/362; 463/9; 706/927; 345/211
(58) Field of Search ................................. 434/118, 156, 434/169, 185, 307 R, 308, 322, 323, 362, 365, 236–239, 350; 704/1; 706/927; 345/113, 114, 302, 333, 335, 355, 356, 211, 212, 418, 352, 213, 433, 473, 326, 340, 349; 273/429–432; 463/30, 31, 9; 705/1, 26, 27, 14; 707/512; 713/330, 321, 200, 201, 1; 351/223; 348/6, 9, 485

(56) References Cited

U.S. PATENT DOCUMENTS

| | | | |
|---|---|---|---|
| 5,307,295 | * 4/1994 | Taylor et al. | 364/578 |
| 5,428,707 | * 6/1995 | Gould et al. | 704/231 |
| 5,498,002 | * 3/1996 | Gechter | 463/31 |
| 5,511,204 | * 4/1996 | Crump et al. | 713/330 |
| 5,664,110 | * 9/1997 | Green et al. | 705/26 |
| 5,680,535 | * 10/1997 | Harbin et al. | 345/473 |
| 5,694,199 | * 12/1997 | Rodriguez | 351/223 |
| 5,738,527 | * 4/1998 | Lundberg | 434/322 |
| 5,740,549 | * 4/1998 | Reilly et al. | 705/14 |
| 5,745,109 | * 4/1998 | Nakano et al. | 345/340 |
| 5,794,189 | * 8/1998 | Gould | 704/231 |
| 5,825,407 | * 10/1998 | Cowe et al. | 348/6 |
| 5,827,071 | * 10/1998 | Sorensen et al. | 434/323 |
| 5,848,231 | * 12/1998 | Teitelbaum et al. | 713/200 |
| 5,852,436 | * 12/1998 | Franklin et al. | 707/512 X |
| 5,905,492 | * 5/1999 | Straub et al. | 345/333 |

* cited by examiner

Primary Examiner—Joe H. Cheng
(74) Attorney, Agent, or Firm—Kirton & McConkie; Michael F. Krieger

(57) ABSTRACT

In a given environment where a user may work, play, or otherwise interact, such as the environment provided by a system comprising computer hardware and software, the present invention provides a method, computer program product, and system for teaching reinforcing concepts, principals, and other learned information without requiring user initiation of a learning sequence. Learning or reinforcement occurs by presenting "learning frames" in the environment automatically without requiring user initiation of the learning sequence. The user of the environment receives these intrusive or non-intrusive opportunities for learning while doing other tasks within the environment and may be interrupted from the task at hand and be required to respond to the presented learning frame or may simply have the opportunity for learning without requiring interruption of the task at hand according to the implementation of the present invention. In this manner, learning occurs as a by-product of other useful work, play, or other interaction with the environment and does not require dedicated user time and overt effort.

2 Claims, 7 Drawing Sheets

METHOD FOR TEACHING IN A SCREEN-SAVER ENVIRONMENT

RELATED APPLICATIONS

This application is a continuation of application Ser. No. 09/173,305, filed Oct. 15, 1998, now abandoned, which is a continuation of U.S. patent application Ser. No. 08/703,348, filed on Aug. 26, 1996, now U.S. Pat. No. 5,827,071.

BACKGROUND OF THE INVENTION

1. The Field of the Invention

The field of the present invention includes teaching methods, particularly those using computers to teach concepts primarily using visual and aural interaction with the user. More particularly, the invention relates to computer-based learning systems where the learning portion or learning frame is presented onto the display while the user is working with other computer applications or the operating system itself. Another field of the present invention includes those areas where "teaching" is automatically incorporated with some other task thereby requiring less user effort or focus to initiate learning.

2. Present State of the Art

The area of teaching methods and devices is broad and diverse encompassing many different ways of teaching a variety of different concepts, principles, and other commonly learned information. Throughout this application, in order to simplify the approach used by the present invention, the exemplary information taught will be the meaning, pronunciation, spelling, and usage of vocabulary words. Because the present invention may be applied to many other types of learning, the example of increasing vocabulary is not to be construed as limiting the scope of the ensuing claims because virtually any item of learning or learning frame is capable of being taught or reinforced by the present invention.

For teaching vocabulary, books and audio tapes comprise the traditional approach that an individual would use. There are a number of problems with each of these two varieties of media that some students may find troublesome. These include dedicated student learning time, student initiation of each individual learning sequence or learning frame, lack of pronunciation information in some instances, lack of flexibility in choosing desired vocabulary words (or other unit of learning), etc.

In order to use a book or audio tape, a student must spend an allotted time studying a book or listening to an audio tape. This "dedicated time" may be difficult to schedule for a busy and overburdened student, and it is likely that those students interested in improving their vocabulary or learning some other form of information will be precisely the type of person that has little time to dedicate to such a task. The net result is, that while the books and tapes may be purchased with the best of intentions in mind, their actual use by the student and hence student learning may be severely limited due to the learning format.

Books and other forms of printed media, in particular, have the added inability to present to the student the actual pronunciation of a word as it would sound alone or as used in a sample sentence. Though phonetic descriptions of the word may exist, they do not replace actually hearing the word as it would be spoken. Furthermore, the process of learning from a book is tedious and requires focused concentration as well as the dedicated time for studying. The lack of verbal pronunciation may make some students hesitant to use the new words learned for fear of embarrassment due to incorrect pronunciation.

While audio tapes are helpful because the student can actually hear the words as pronounced and used, the student is forced to learn the words as they are presented in the tape. A student may be compelled to listen through an entire taped presentation in order to learn the few words that are most relevant and important to the student. There is no way to pick and choose the particular units of learning (e.g., individual vocabulary words) or the ordering of the learning frames (e.g., individual vocabulary words). Furthermore, this causes poor word reinforcement and may make it difficult for the student to remember and use the words as they were discussed in the audio tape presentation. Again, the student must dedicate a block of time in order to learn the words. The same problems mentioned in connection with learning a new vocabulary word also exist when learning with other forms of information.

Computer hardware/software systems provide many options for dealing with the deficiencies found in the more traditional books and audio tapes. Multimedia systems provide particularly useful solutions since both visual and audible sensory stimuli may be used as part of the teaching interaction between the student and the computer environment.

For vocabulary building, some systems allow pronunciation of words and quizzing (e.g., multiple choice, sentence completion, flash cards, etc.) but lack flexibility in choosing and ordering individual words to be learned by the student. Furthermore, existing programs and systems require the student to dedicate time to learning. In other words, the student operates the program or system with the express purpose of learning the vocabulary words and must suspend work on other tasks while dedicating his or her time to the task of learning. As mentioned previously, this has serious drawbacks for those students who are already over burdened and who are looking for fast, convenient ways of learning and learning reinforcement of new vocabulary words or other types of learning. Currently, no product for building vocabulary allows customized word lists, including words entered and defined by the user, or non-student initiated learning sequences with the learning sequences occurring during a student's normal activities within a given environment.

SUMMARY AND OBJECTS OF THE INVENTION

It is an object of the present invention to allow intrusive and non-intrusive learning and learning reinforcement while a user is interacting with an environment by presenting a learning frame (i.e., initiating a learning sequence) into and integrated with the environment.

It is another object of this invention to allow learning to occur in an environment without a dedicated time commitment on the part of the student.

It is a related object of the invention to allow learning to occur while the student is achieving other useful tasks within a given environment.

It is an object of the invention to provide vocabulary building that focuses on a finite subset of "focus" words from a chosen list of words with the subset automatically changing only as particular words are mastered until all desired words in the chosen list are mastered.

It is another object of the present invention to allow user flexibility in choosing the learning frames (e.g., vocabulary words, etc.) and ordering them as desired.

It is a further object of the present invention to allow correct pronunciation of vocabulary words, including word usage in sample sentences, and other information suitable for aural learning to be presented to a student through the appropriate sensory means within a given environment.

Additional objects and advantages of the invention will be set forth in the description which follows, and in part will be apparent from the description, or may be learned by the practice of the invention. The objects and advantages of the invention maybe realized and obtained by means of the instruments and combinations particularly pointed out in the appended claims.

To achieve the foregoing objects, and in accordance with the invention as embodied and broadly described herein a method, computer program product, and system for teaching concepts, principles and other learned information without requiring user initiation of a learning sequence is provided herein.

The present invention operates within an environment being perceived by a user through sensory stimulating means and the user interacting with the environment with certain input devices into the environment. A typical example is a computer with the main form of sensory perception being the computer monitor for visual stimulus. Speakers and other devices can be used for aural stimulis.

Automatic learning or reinforcement occurs as opportunities are presented in non-intrusive ways without disrupting the user's interaction with the environment or requiring user interaction and completely interrupting the user activities. Further, intrusive methods may also be used to "force" learning before allowing a user to continue interacting with the environment.

Such "learning frames" occur or are presented in response to certain trigger events in connection with other user action without requiring user initiation of the learning frame presentation (i.e., indirect user action). For example, learning frames may be presented upon entrance or exit to a program or in connection with certain program operations when looking at the environment of a computer system. Furthermore, learning frames may be presented asynchronously based on an internal timer and exhibit themselves in the form of pop-up dialog boxes, screen savers, quizzes requiring user selection, etc.

In this manner, a user learns without dedicating time to the task of learning since learning occurs without user initiation of a learning sequence or directly causing a learning frame to occur. A user may be "forced" to learn (e.g., a screen saver prohibiting a user from entering back into the environment until after a number of learning frames are correctly processed), or learning may simply be presented as non-intrusive opportunities (e.g., a user gently reminded of a some particular information by a small dialog box entering from the side of the visually perceived environment without entering the central area) and other methods falling in between these two extremes.

Learning frames can be automatically marked into pedagogically useful categories according to a predefined criteria in order to enhance learning. For example, some learning frames could be marked as mastered or trouble based on a ratio of correctly answered quiz frames. Learning frames could be processed according to the categorization with a mastered learning frame receiving less emphasis and a trouble learning frame receiving comparatively more emphasis.

Besides having application in the business world as part of the PC environment, this invention also has application in use with computer games. It is well known that many children prefer to play computer games rather than participate in actual learning using education programs. The present invention can be implemented so that a computer game is periodically suspended or interrupted by the presentation of a suitable learning frame. In order to continue playing the game, the child would be forced to enter a learning sequence and correctly answer a set number of correctly processed learning frames. In this manner, parents may rest assured that after an entire evening of playing computer games, Junior will also have spent an appreciable portion of time in healthy and beneficial learning activities such as learning spelling words, reviewing mathematic tables, and other useful learning.

These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawing depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
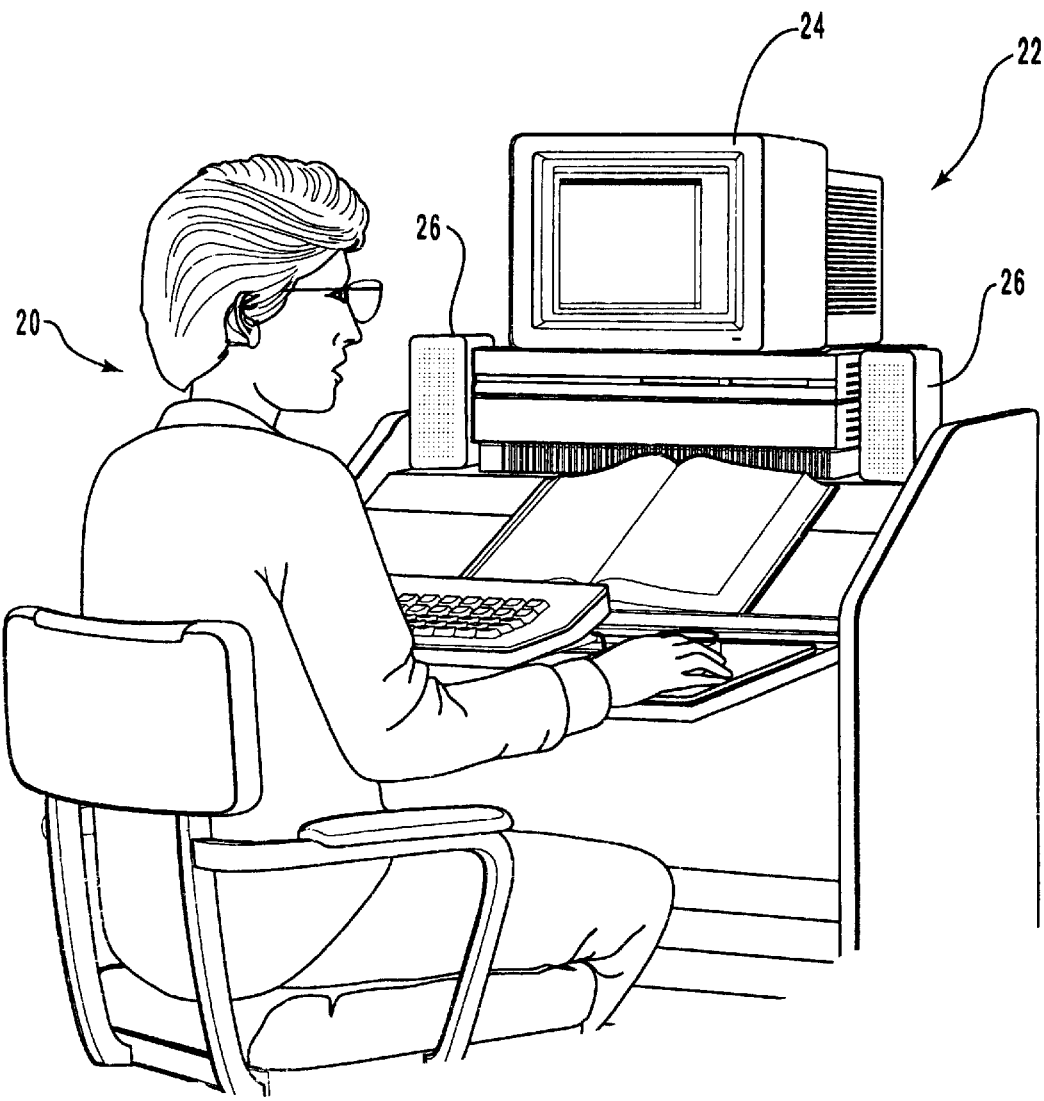
FIG. 1 is a drawing of a computer user interacting with an environment provided by a computer as transmitted through the visual display and/or speakers and perceived by the user's senses.

As used herein the term "learning frame" refers to a unit of learning having components that are sensorially perceived, typically comprising a visual component and/or sometimes an aural component, and/or an environment sequence performed by a user that conveys or otherwise teaches concepts, principals, and other commonly learned information to the user. The term "learning sequence" comprises all of the environmental interactions between the user and the environment for processing a learning frame, and thus the terms learning frame and learning sequence are highly interrelated.

A common example of a learning frame in the vocabulary building context would be the presentation of a vocabulary word with its associated meaning in visual form. An example of a learning sequence may be the presentation of a vocabulary word with a number of alternative choices for definition and requiring the user to select one definition as the correct definition thus testing the user's ability to distinguish the word's definition from a number of choices. An aural component in either case would be the pronunciation of the word being presented as part of the learning frame or learning sequence whether automatically or at the initiation of the user. This would include pronunciation of the word alone, as used in a sentence to show any emphasis the word may receive in common usage or other pedagogical purpose, as pronounced by the user for comparison and feedback purposes, etc.

The term "environment" as used herein defines how a user interacts with a computer or other electronic or mechanical device that conveys information to the user. With respect to a computer or other central processing unit (CPU) based system, there are typically hardware and software components that help make up the environment. Hardware components include but are not limited to the CPU itself; storage system; keyboard, mouse, and other input devices; a CRT, LCD or other display devices; speakers, piezoelectric buzzers, and other auditory components; etc. Software components include but are not limited to an operating system, application programs, firmware, etc. Such software components often control the visual appearance of a display device and determine how a user of the environment interacts using the input devices in response to stimuli communicated to the user through the display, speakers, and other sensory output devices. Interaction sequences or interaction paradigms are implemented as part of the environment that allow the user to accomplish useful work, entertainment, etc.

A common example of an environment is that which is presented through a common personal computer (PC) with the operating system and application programs determining the interaction sequences performed by the user using the mouse keyboard and other input devices and controlling the visually displayed "desktop." Throughout this application, the example of a visual display means on a personal computer system is used for showing how the invention works in presenting a learning frame to the user of the environment without requiring user initiation. This is not to be viewed as limiting since a learning frame may be presented on any means perceived by the human senses ("sensory means"). Therefore, the definition of environment is not limiting and other non-exhaustive examples would include: A hand-held video game, a cash register with visual display, a digital or analog watch, a telephone having some form of informational display, pagers, all forms of consumer electronics, etc.

A "storage means" is defined broadly to incorporate any type of device interfaceable to a computer that is used to memorize information and includes both long-term and short-term storage. Thus storage means would include though not be limited to cache memory, RAM, disk storage, tape storage, etc. Furthermore, storage means contemplates the entire system of storage incorporated by a computer in combination so that the RAM, cache, and disk drive together could be considered a storage means. A storage means can also be logically partitioned so that items are stored in different media or in different parts of the same media. For example, a storage means comprising RAM and disk storage could be logically partitioned so that item A is stored in a portion of RAM (first partition), item B is stored in another portion of RAM (second partition), and item C is stored on disk (third partition).

The term "trigger event" as used throughout this application refers to those user actions or asynchronous timing events that initiate the presentation of the learning frame. For example, any user operation within the environment may be used as an indirect trigger event such as hitting a certain key, moving the mouse within a certain area of the visual display, entering or exiting a particular program including the operating system for entering the environment itself, or performing any operation performed within a particular program. Furthermore, the expiration of certain timers, etc. can be used as asynchronous timing trigger events.

Essentially, the initiation of a learning sequence may be tied to a multitude of different and varied activities that a user would normally do without the specific intent to initiate a learning sequence. The user indirectly causes a learning sequence as part of normal interaction within the environment to accomplish work or play.

As mentioned previously, the exemplary embodiment to illustrate the features and the operation of the present invention is a vocabulary enhancement program. This is not to be viewed as limiting since any type of information can be taught or reinforced using the concepts illustrated herein.

Referring now to FIG. 1, a user 20 is shown operating a personal computer 22. The environment as perceived by user 20 includes perception of visual images from the CRT 24 and sound information from speakers 26. The speakers 26 and CRT 24 constitute sensory means that can be perceived by the user 20 and they communicate information regarding the environment to the user.

The user 20 interacts with the environment through mouse 28 serving as an input device and keyboard 30 also serving as an input device. The environment is defined as the images and sounds presented to the user through the CRT 24 and speakers 26 along with the conventions and required interaction by the user 20 through use of the mouse 28 and keyboard 30.

Figure 2:
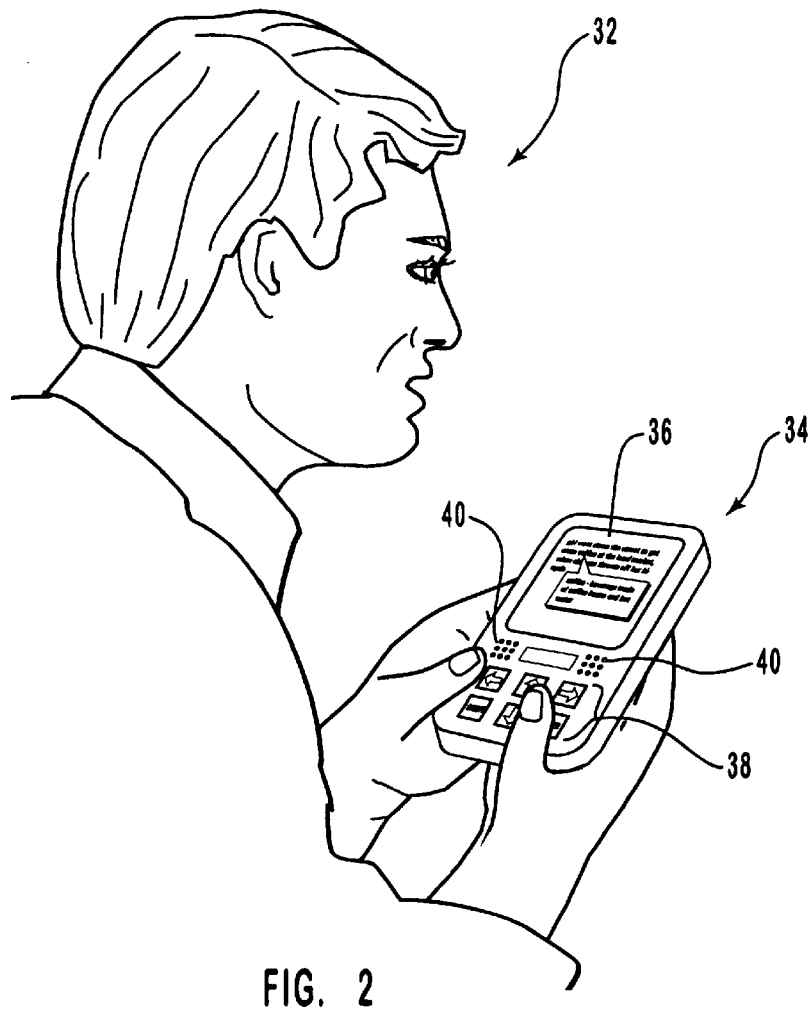
FIG. 2 shows a different user interacting with a different environment than that shown in FIG. 1, the environment being provided by a personal digital assistant.

Referring now to FIG. 2, a different environment is shown. User 32 is operating a personal digital assistant (PDA) 34 that has an LCD display area 36, hand operated controls 38, and speakers 40. The user 32 interacts or communicates to the PDA 34 through the hand operated controls 38 and information is conveyed to the user 32 from the PDA 34 through the LCD display area 36 and the speakers 40. The environment is perceived by the user through the LCD display area 36 and speakers 40 while the particular conventions and controls that the user must manipulate in order to accomplish useful tasks is done through the hand operated controls 38.

For both FIGS. 1 and 2, it becomes apparent that an environment according to the present invention can take on many different forms and shapes. Further, a learning frame may be presented to the user indirectly through the users operation or interaction with the environment or asynchronously by means of time or expiration. In either case, the user does not consciously and directly initiate a learning sequence or presentation of a learning frame and need not consciously dedicate or allocate time to learning.

Figure 3:
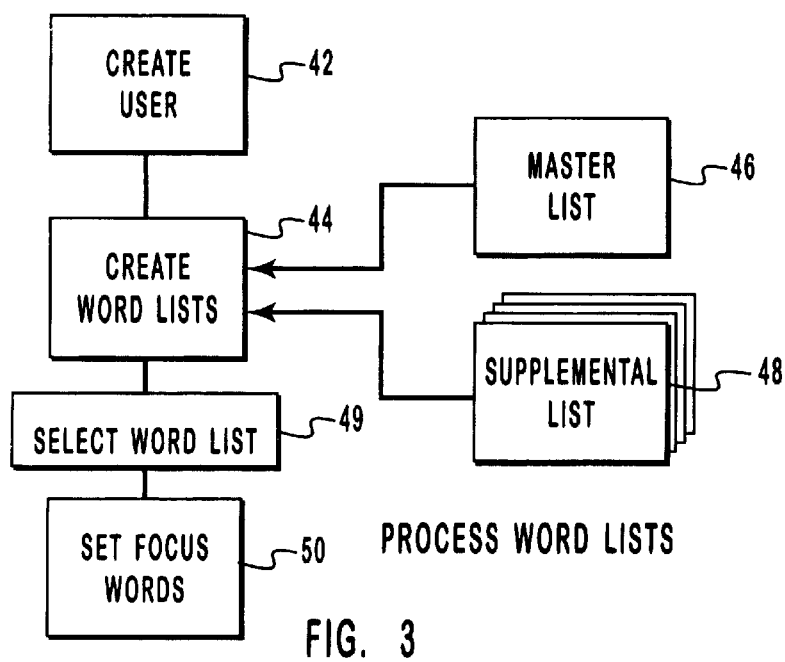
FIG. 3 is a flow chart showing the processing of vocabulary word lists for an exemplary embodiment of the present invention incorporated in a vocabulary enhancement program wherein the learned information is the meaning and the pronunciation of words to be used by a student for enhanced vocabulary.

FIG. 3 is a flow chart of showing the processing of word lists for the vocabulary enhancement program exemplary embodiment of the present invention. Since different users may use the computer upon which the vocabulary enhancement program runs, individual users are created at step 42 so that the word lists created can be associated with particular users.

At step 44, the word lists are created by taking user-selected words from a master list 46 and/or a plurality of supplemental lists 48. Furthermore, a word list may be created by simply selecting a predefined list. The supplemental lists 48 may be add-on modules for specific categories of vocabulary lists. For example, medical terminology, legal terminology, business/finance terminology, etc. may be available in separate, supplemental list packages that can be added or accessed in addition to the original data base of the program as found in master list 46.

The user has complete flexibility to choose the words that are desired for vocabulary enhancement. This allows a user to customize the vocabulary list to his or her particular needs. Because of such individualized selection, a user is not forced to learn words that she may already understand or has no desire to learn.

Choices for the user word list are made from existing master and/or supplemental word lists or, more importantly, a user may directly input their words of choice into the user word list that do not exist within the word lists available in prepackaged format. Such user entered words may also require the input of definitions, usage sentences, synonyms, antinymns, etc. or other information such as recording the pronunciation of the word in order to make the user entered word compatible with the full functionality of the program. This is particular useful to those who are trying to learn a very technical lexicon that may not justify commercial availability of a prepackeged word list corresponding to the particular word set.

Besides choosing the actual words, the user may choose the order they appear on the user word list and reorder them as desired. Filters and other tool may be applied to the master and supplemental word lists to arrive at user word lists and those skilled in the art will see other mechanisms for creating user word lists.

To aid in the learning process and allow individualized approaches based on the user, personal mnemonics may be entered in some embodiments in either visual or aural form according to implementation. In this manner, the user can use hints or helps that are unique and thereby personalize the learning process and make it more effective. Such mnemonics can then be incorporated into the learning frames for automatic or manual presentation.

As an added feature, the user may mark certain words as "mastered" or as "trouble." A trouble word is one which is difficult for a user to discern in a quiz situation or difficult to remember the proper meaning or definition. A mastered word is one that the user can nearly always discern in a quiz format and needs less reinforcement. The user may determine whether a word is trouble or mastered by operating the vocabulary enhancement program in the flashcard or particularly the quiz mode as will be explained hereafter. The marking of a word as mastered or trouble occurs manually as part of creating the word list at step 44 or may occur automatically as part of an automark feature explained hereafter.

A default word list is selected at step 49 for use with other elements of the program (e.g., operation in quiz mode or flashcard mode) and a user may select whichever of a number of user created or predefined word lists that suit the user's purposes at a given point in time. Naturally, robust implementation will allow a user to switch word lists easily throughout operation of the vocabulary enhancement program. Furthermore, the program may be pre-loaded with defaults so that a user need not explicitly choose any options to allow the user to quickly experience the benefits of the program with a minimum of set up complexity. The options shown throughout this description, particularly the autolearn features explained hereafter, may all be pre-loaded with appropriate defaults that do not require express user initiation in order to start so as to minimize time and effort spent installing and running the program to a point where the benefits of the particular features are manifest. All such options are explained as if the user manually set them prior to enablement or use to show the flexibility incorporated within the vocabulary enhancement exemplary embodiment of the present invention.

Another feature that helps direct a user's learning is the concept of "focus" words. Focus words are a manageable number of words that a user will focus on from the entire list until they are mastered or otherwise deselected for focus. A user may select the focus words at step 50 by indicating a number of words, selecting the actual words themselves, or changing the order of the user word list. Once focus words are chosen, a user may receive intense reinforcement for those words by actuating the appropriate controls. This provides even more user control on the type of learning that takes place. If a number is given to indicate focus words, then that number of words from the top of the list may be chosen as the focus words and as words are mastered new words are added to the focus list so that the focus list is automatically replenished as words become mastered.

Those skilled in the art will undoubtedly see many variations in user creation, vocabulary list creation, and focusing schemes (e.g., mastered and trouble words, focus words, etc.) that can be utilized. An example of dialog boxes for managing the processes explained in connection with FIG. 3 is shown in Appendix A (pages A1–A3).

Figure 4:
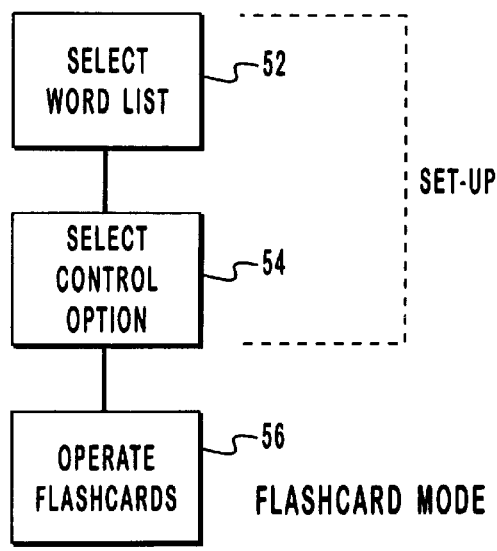
FIG. 4 is a flow chart illustrating the processing steps for operating the vocabulary enhancement program while operated in flash card mode requiring dedicated user time and user initiation of a learning sequence.

Referring now to FIG. 4, a flow chart for showing operation of the vocabulary enhancement program embodiment of the present invention when used in flashcard mode is shown presented. First, a word list is selected a step 52 from those previously created for a particular user. Next, a number of control options are selected at step 54 for determining which words are used and how the words are presented in flashcard mode. These options include but are not limited to such things as determining which words from the selected word list are used (e.g., all words, focus words, mastered words, trouble words, etc.), whether the words are displayed automatically or manually, whether the visually displayed flashcard is automatically flipped and if so how often, whether the word or the definition appears on the displayed flashcard, etc. Naturally, those skilled in the art will see various options that may be added to the above list and not all the previously enumerated options are necessary in order to have effective flashcard operation.

Steps 52 and 54 constitute a set up before actually entering into and operating the flashcards at step 56. The user will give directed effort to reviewing and learning while operating in flashcard mode at step 56 and may mark words as mastered, or as skill and confidence grow or trouble should an honest self assessment so warrant. Those skilled in the art will see variations to both the set up and operation of the flashcard mode that may be implemented according to a specific design. A sample set up dialog box for operating the flashcard mode as well as sample flashcard operation is shown in Appendix A (page A4–A6).

Figure 5:
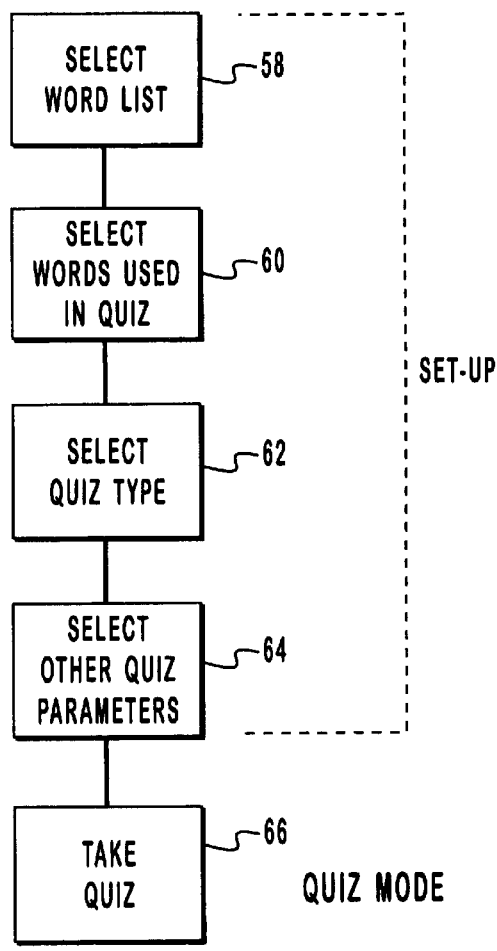
FIG. 5 is a flow chart showing the processing steps for operating the vocabulary enhancement of the exemplary embodiment in quiz mode again requiring dedicated user time and user initiation of the learning sequence.

FIG. 5 shows a flow chart of the quiz mode operation of the exemplary embodiment of the present invention as a vocabulary enhancement program. Initially, a word list is selected at step 58 from those previously created (as shown in FIG. 3). Within the selected word list, types of words may be selected for use in the quiz at step 60. For example, all words, focus words, mastered words, trouble words, etc. may be chosen for use in the quiz as determined by the needs of the user.

Also selected is the quiz type at step 62 from amongst a number of different choices. For example, the user may be asked to select a similar word from a list of choices, select the opposite word from a list of choices, select a correct definition from a number of choices, complete a sentence by choosing the proper word, etc. Furthermore, a user may select a randomize option so that all of the different quiz types will come randomly using the words as selected from the chosen word list.

Finally, all other quiz parameters are selected at step 54. These parameters include the number of quiz frames or learning frames to be presented, a timer value that can be used allowing the user only so much time to make a choice or selection, etc. Other options may also be included to provide a more robust implementation and those skilled in the art are likely to include such depending on specific implementation.

Once the initial set up for the quiz mode is accomplished by execution of steps 58, 60, 62, and 64, the actual quiz is taken by the user at step 66. Entering quiz mode and taking the quiz at step 66 requires user initiation of the learning sequence as well as dedicated user time to operate the quiz frames. It may be noted that quiz frames may be presented in conjunction with the autolearn features discussed hereafter where they will not require user initiation of the learning sequence nor dedicated user time for learning. The discussion in connection with FIG. 5 is simply a description of one possible implementation of a quiz mode for a vocabulary enhancement program and many other options may exist as those skilled in the art will undoubtedly notice. An example of a dialog box comprising the set-up steps 58, 60, 62, and 64 as well as some quiz mode screen formats are shown in Appendix A (pages A7–A11).

Quiz results may also be tabulated, stored, analyzed, and presented for competence with respect to the vocabulary word lists, in this manner a user may track progress as words eventually become mastered. The user may manually mark words as mastered once the user-specified level of mastery is achieved by marking the words manually or criteria may be set within the program so that the words automatically become marked as mastered according to the quiz results as will be explained in more detail hereafter. Conversely, a user may mark a particular word as trouble manually or this may occur automatically by the program based on predefined criteria. One way of selecting words and presentation sequence would be to select a set of vocabulary words, randomize the order of the words, present a quiz frame for each word in the set, and tabulate the results for feedback purposes. An example of a dialog box showing tabulation of quiz results is shown in Appendix A (page A12).

Figure 6:
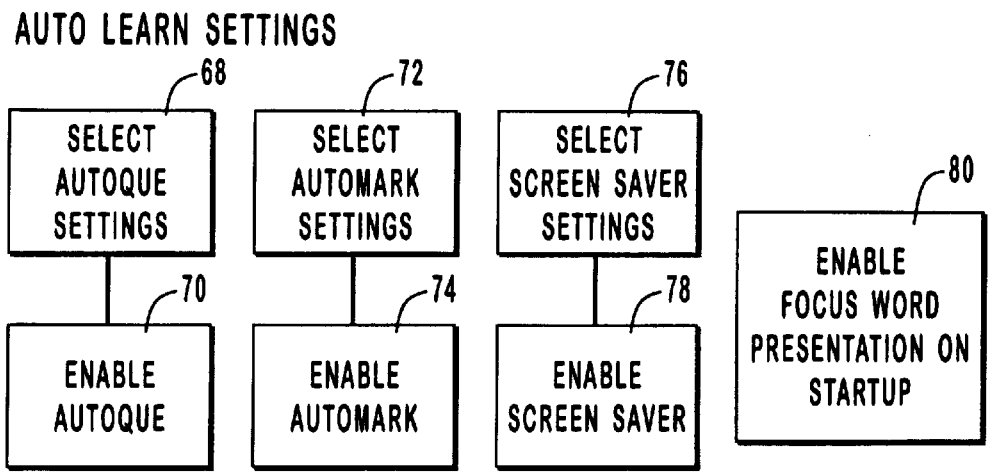
FIG. 6 is a flow chart showing the processing steps for the initialization and use of the automatic learning features of the vocabulary enhancement program exemplary embodiment that, when operating, do not require dedicated user time nor user initialization of the learning sequence.

FIG. 6 shows initialization and enablement of various autolearn settings that enable the vocabulary enhancement program to present the learning frames without initial user interaction to reinforce or cause learning without requiring conscious dedicated user time. The first autolearn mechanism is the autoque feature and the autoque settings are selected in step 68 after which autoque is enabled at step 70. The autoque feature causes a learning frame to be presented within the work environment of the user while the user is busy interacting with the environment in some fashion.

The autoque settings that may be selected include but are not limited to the frequency of learning frame presentation, the duration of learning frame presentation for learning frames that will automatically de-integrate themselves from the environment, whether sound is used to pronounce a vocabulary word, hint, or sentence within the learning frame as visually integrated into the visual portion of the work environment, and various learning frame settings. The learning frame settings may include a randomized selection from among the following components: the word only, the word with definitions, the word with synonyms, example sentences, etc.

Other possible options include but are not limited to a quiz mode learning frame presentation requiring a learning sequence where the user must select the correct word before being permitted to return back to the environment or requiring the user to correctly spell an audibly pronounced word. These would be examples of intrusive interruptions that tend to encourage learning in a rather forceful way. Again those skilled in the art will undoubtedly see countless variations and logical enhancements that can be made to be a basic concept of learning frame presentation without requiring initial user interaction.

Figure 9A:
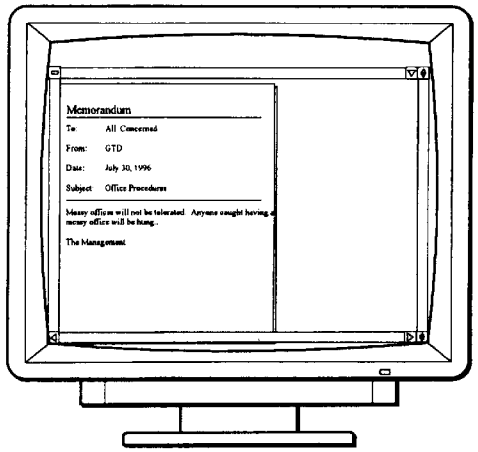
FIGS. 9A–9D are a series of computer display screens showing the use of a floating dialog box that non-intrusively provides the opportunity for learning in a visually perceived environment.
Figure 9B:
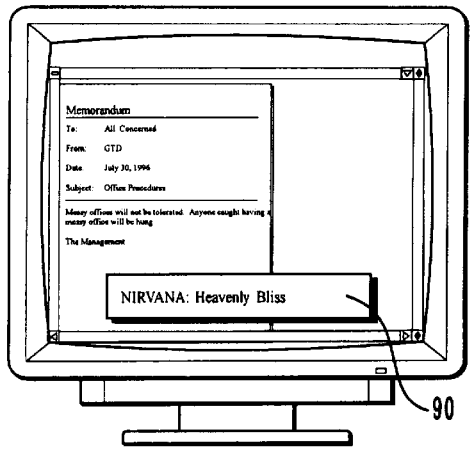
Figure 9C:
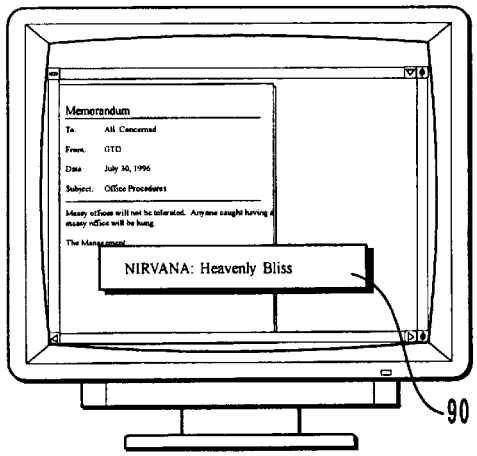
Figure 9D:
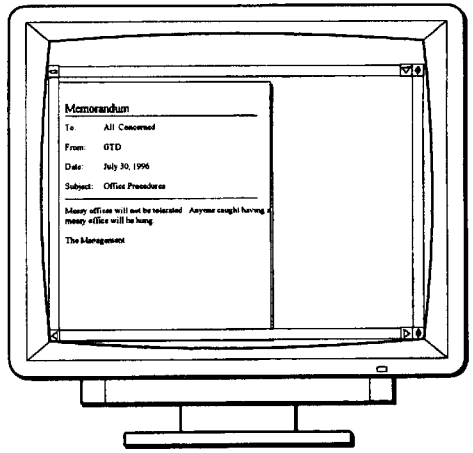

Referring now to FIGS. 9A–9D, the actual operation of the autoque feature is shown as a movable box that becomes part of the environment. FIG. 9A shows a computer display having the visually perceived portion of a work environment thereon. FIG. 9B shows the dialog box or information window 90 making an appearance into the work environment to be integrated therein to provide the opportunity for the user to view the vocabulary word and associated definition. FIG. 9C shows the dialog box or information window 90 which may or may not move to a different location within the work environment. Movement draws the user's attention in order to encourage reinforcement or actual learning of the vocabulary word. Sound could also be used to draw attention. Finally, FIG. 9D shows the dialog box or information window 90 disappearing and no longer integrated with the environment so as not to disrupt the user in any substantial way from working or playing within the environment. This is a non-intrusive form of reinforcement that simply encourages or reminds the user of the opportunity for learning that can be taken at the user's discretion. The user does not dedicate time to initiate such learning or the presentation of the learning frame yet benefits from the opportunity to reinforce words learned or to learn new words as desired.

Figure 10A:
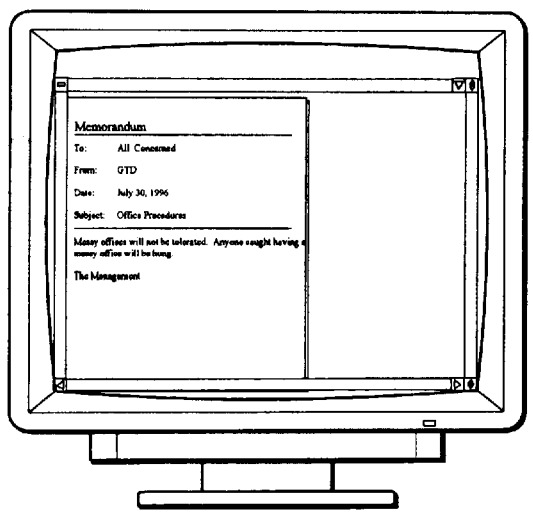
FIGS. 10A–10C are a series of computer display screens showing the use of a pop-up dialog box as a form of automatic learning that is intrusive in that it may require user response to the non-user initiated learning sequence before the user may return to the interrupted tasks within the environment.
Figure 10B:
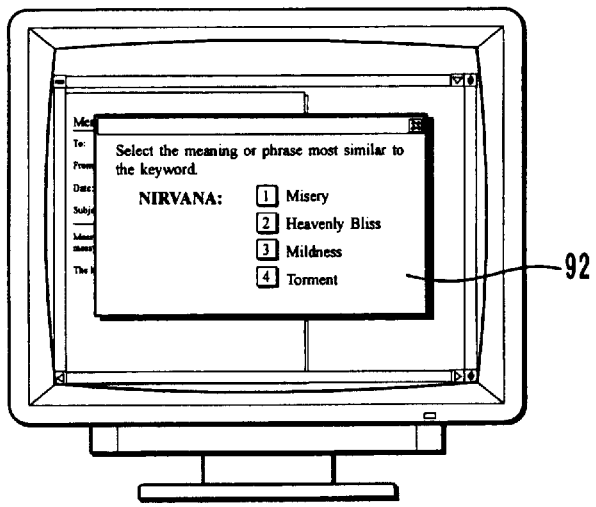
Figure 10C:
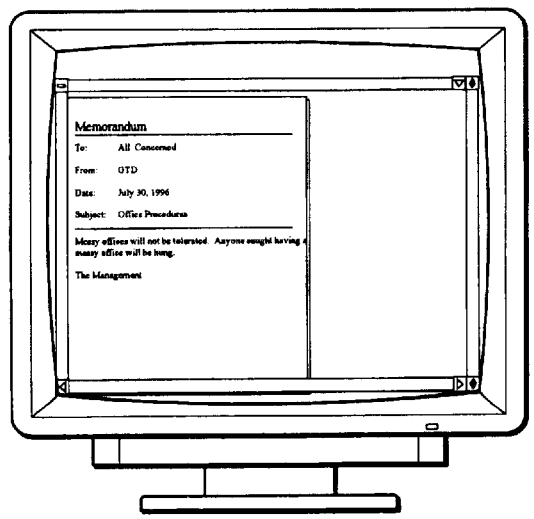

FIGS. 10A–10C show a different form of presentation of the learning frame that could be controlled with the same autoque settings. FIG. 10A shows the work environment before presentation of the learning frame while FIG. 10B shows presentation of the learning frame by way of dialog box 92.

Note that the learning frame is presented in quiz mode within the dialog box thereby requiring a learning sequence with the user wherein the user needs to respond in order to remove the dialog box. This is a more intrusive way of reinforcing words since it does require user interaction. Note also that the user may close the dialog box 92 without answering the quiz should the user so desire. It may also be noted that the learning frame presentation may take on other forms such as flashcard, etc. or be accompanied by sound pronunciation of the word, a sentence using the word, or some form of previously entered user mnemonic in aural or visual form. Those skilled in the art will see many ways of learning frame presentation within a dialog box format.

As shown, the dialog box may be removed directly or by selecting the appropriate answer. Naturally some embodiments may be made more harsh in that they could require the user to select the correct answer as way of being able to return back to the previous tasks at hand.

While many adults may find such forced learning annoying when applied to themselves, ample opportunity would exist for using such features with respect to their children who may be using a personal computer and playing computer games. In this manner, a parent may feel some satisfaction that some learning could be imposed upon a child who ostensibly wants to play a computer game and what many parents consider frivolous time a waste.

FIG. 10C shows a return to the environment once the learning frame as presented in the dialog box 92 has been removed by correct user interaction. Once again, the learning frame has been temporarily integrated into the user's environment providing the opportunity for learning of vocabulary words and reinforcement of words previously learned.

While FIGS. 9A–9D and 10A–10C show two different forms of learning frame presentation using the same autoque settings, those skilled in the art will appreciate that many forms, variations, and combinations of learning frame presentation may be used, particularly on a multimedia computer systems. For example, a ticker tape may constantly show different words and meanings coming across, sound ques such as vocabulary word and meaning pronunciation, vocabulary word usage within a sentence, etc. may be presented to the user without any visual component, animation sequences may provide a humorous and entertaining way of presenting a learning frame, etc. In all such cases, the presentation of the learning frame and the initiation of the learning sequence occurs without overt user intervention.

Referring back to FIG. 6, operation of the automark feature is shown by the indicated steps 72 and 74. The automark feature will automatically mark words as trouble or mastered according to a particular criteria chosen in the select automark settings at step 72. Some criteria that could be chosen include, but are not limited to, a pre-set number of times in a row that a particular word has been answered correctly for marking as mastered or trouble, respectively, a certain ratio of correct or incorrect choices in quiz mode (e.g., four out of five, etc.), or any other criteria that may be a useful indicator for determining whether a particular word has been mastered or is trouble for a user. Finally, the automark feature is enabled at step 74 after which the vocabulary enhancement program of the exemplary embodiment will thereafter automatically mark words in the current word list as mastered or trouble as indicated in the automark settings. The program may be preloaded with the automark feature enabled and certain settings chosen as defaults so that the user need not do any installation or initialization in order to receive the benefits of this particular feature.

Another autolearn feature is the use of a screen saver that will include information about a particular word. The screen saver may be animated and may or may not require user interactions to select a correct answer. In order to end the screen saver mode and allow the user to return to the environment. This is first accomplished by selecting the screen saver settings at step 76. These settings indicate the type of learning frame and how presented (e.g., quiz mode, type of quiz mode, word only, word and definition, pronunciation options for word, usage sentence, or meaning, etc.) the amount of time before the screen saver becomes operative, whether there is a password associated with the screen saver, etc. Finally, the screen saver mode is enable at step 78 so that this form of automatic learning that requires no user initiation of the presentation of the learning frame can begin.

Figure 8A:
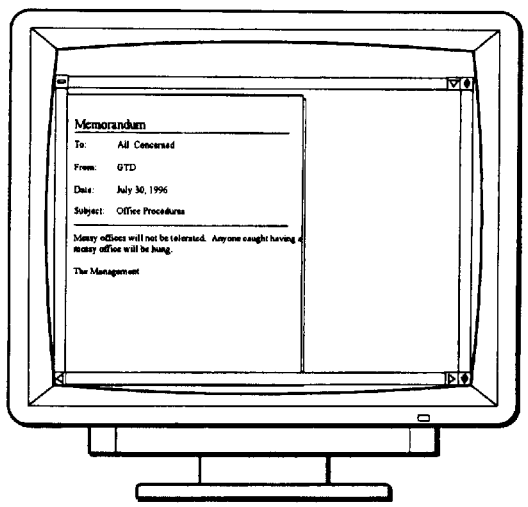
FIGS. 8A–8C are a series of computer display screens showing the use of a screen saver as an automatic learning device.
Figure 8B:
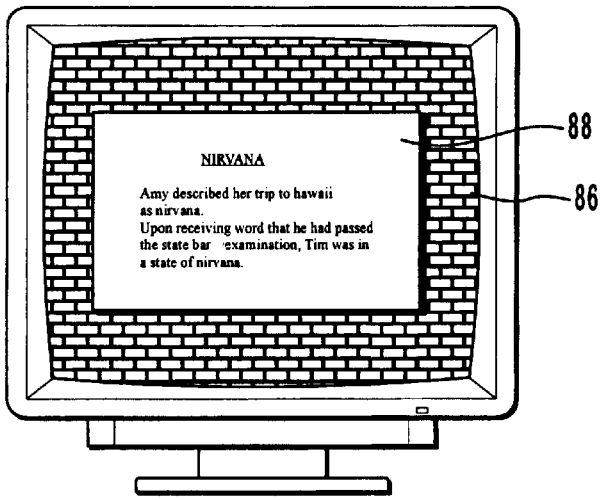
Figure 8C:
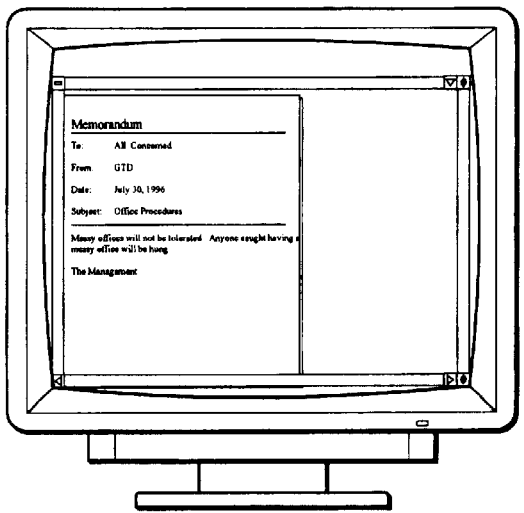

FIGS. 8A–8C show an example of how a screen saver, according the present invention may work. In FIG. 8A, the visual aspect of a user environment as shown on a computer display is presented. In FIG. 8B the screen saver 86 has been activated with a learning frame 88 presented therein that requires no user interaction and is presented without any initial user initiation. The learning frame 88 shows a word followed by two sentences using the word correctly. Again, according to the previously selected settings, a number of different learning frame formats may be used including formats that require a learning sequence that utilizes user interaction (e.g., a quiz-mode frame, flashcard frame, sound only, etc.). Finally, FIG. 8C shows a return to the initial environment after the screen saver has become deactivated and the user can at that point continue operating within the environment as before.

The screen saver mode represents yet another way of presenting a user frame without requiring dedicated user time to learn on the frame or learn the information. Also, the user does not need to initiate the learning sequence but rather it is presented while he or she is involved in other environmental interaction. It is important to note that virtually any form of learning frame presentation and learning frame content can be used in conjunction with the screen save and those skilled in the art will appreciate the various forms listed throughout this application as well as others that can be used in conjunction with the present invention.

Finally, FIG. 6 shows enablement of focus word presentation on program startup at step 80. Essentially, upon initialization of the vocabulary enhancement program, the focus words as previously indicated are presented for user benefit either in temporary or more permanent mode. For example, vocabulary words may be successively flashed upon the screen in order to remind and refresh the user as to the words that may be most heavily reinforced. Another alternative would be a permanent program dialog box that always shows the focus words or other words from the selected user list while the program is running. Yet another alternative would be a "sticky note" that may be detached from an initial program dialog box and placed anywhere in the environment that is convenient for the user. Again, those skilled in the art will appreciate a variety of different approaches of automatically presenting the focus words or other words from the selected user list in temporary and permanent formats for the user's benefit and learning. An example of a dialog box controlling and enabling the previously enumerated autolearn features and a form of initial word presentation is shown in Appendix A (page A13 and A14, respectively).

Figure 7:
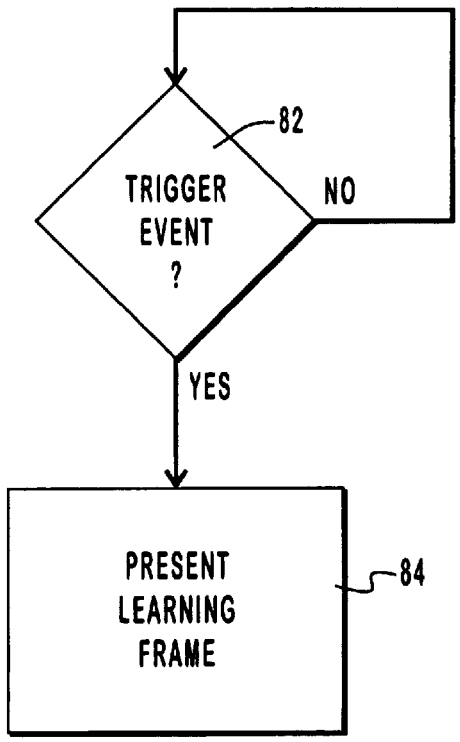
FIG. 7 is a flow chart showing the operation of all of the automatic learning devices of FIG. 6 wherein a trigger event causes the initiation of a learning sequence that may intrusively interrupt an environment user's normal interaction with the environment or may simply present an opportunity for learning to be exercised at the discretion of the user.

FIG. 7 is a flow chart showing the learning frame presentation sequence. Initially a trigger or other event is sensed at step 82. If there is no trigger event, the loop waits until one occurs at step 82, otherwise the learning frame is presented at step 84. The trigger event itself is something that is not directly caused by the user but either occurs asynchronously (i.e., timer expiration) or as an indirect result of user action (i.e., not operating the computer so as to cause the screen saver to be activated). In any such event, the learning frame is presented without any overt user initiation and the contents of the learning frame are viewed or otherwise processed by the user without the user consciously dedicating time to the learning process. In this manner, the present invention assists the user to learn and reinforce learning without requiring the user to allocate and dedicate time to such a task or initiate the task.

Other embodiments of the present invention may be incorporated in systems without a visual display. For example, in an auditory-only computer system utilizing voice recognition technology, audio-only learning frames may be presented. For a language enhancement application, the correct usage of a given word may be "spoken" at random. A more intrusive automatically presented learning frame may query the user on correct spelling thereby requiring the user to say each individual letter in proper sequence to demonstrate the proper spelling of the word before allowing the user to continue operating the auditory-only computer system. Further, any system that can stimulate the human senses can be made to embody the present invention or that stimulates any combination of human senses.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A method for presenting an electronic learning environment, the method comprising the steps of:
    (a) providing a user interactive environment having a storage means;
    (b) equipping the environment with an informational screen saver program;
    (c) presenting a self-initiating learning sequence within the environment as the screen saver program, wherein the learning sequence is intrusive or non-intrusive, and wherein the learning sequence is self-initiating upon the occurrence of a trigger event; and
    (d) presenting the learning sequence to any perceivable user sensory means of the user.

2. A method for presenting educational and informational material in a screen saver, the method comprising the steps of:
    (a) providing a user interactive environment;
    (b) equipping the user interactive environment with a screen saver program, wherein the user may conduct simultaneous activities within the environment;
    (c) presenting a self-initiating learning sequence to the user in the form of the screen saver program, the screen saver program becoming active at the occurrence of a trigger event;
    (d) presenting information to the user via the screen saver, the information comprising:
        1) teaching information wherein a user may be instructed, tested, and quizzed on educational material contained within the screen saver program;
        2) reinforcing information wherein knowledge of the user is reinforced through interaction with the screen saver;
        wherein the type of the information is created and selected at the user's will, and can be presented in varying modes selected from the group consisting of quiz, flash card, definition, meaning, and pronunciation; and
    (e) returning the user to the environment upon completion of the learning sequence.

* * * * *